Sept. 20, 1971

E. L. ROOB ET AL
MIST LUBRICATING AND COOLING APPARATUS FOR A TORQUE-TRANSMITTING MECHANISM

Filed Feb. 3, 1970

INVENTORS
ELWOOD L. ROOB
ALFRED PENKO
WILLIAM W. LYTH
BY Yount and Tarolli
ATTORNEYS

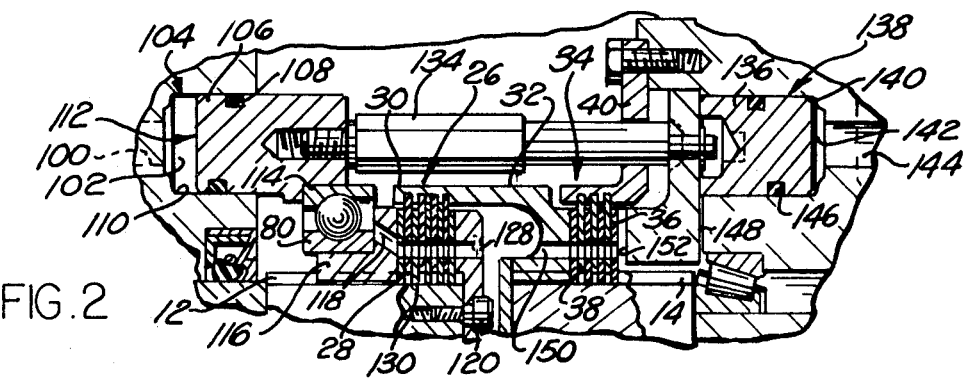
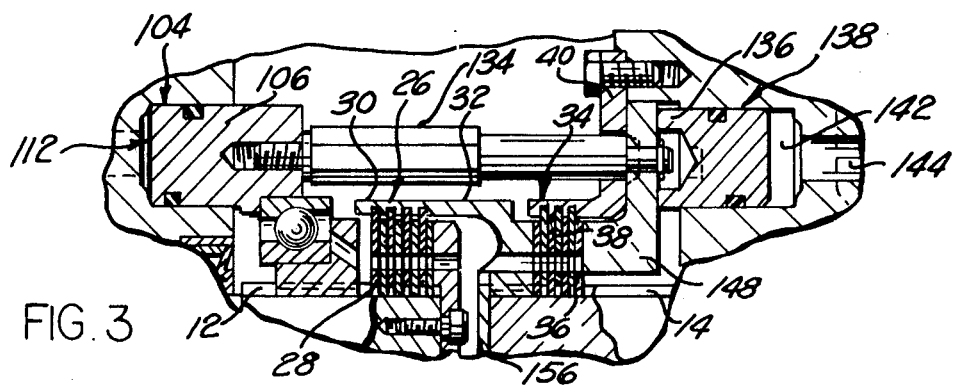
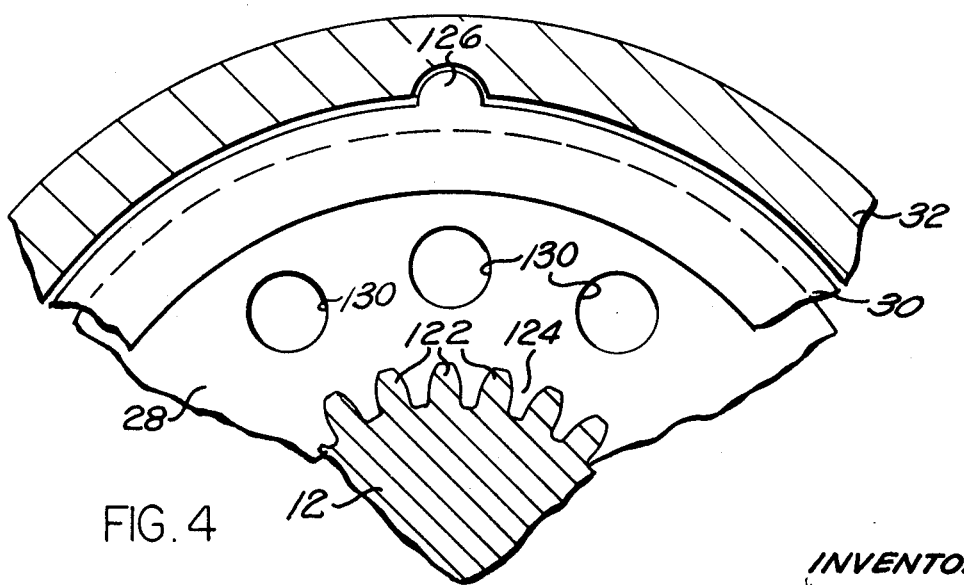

United States Patent Office 3,605,963
Patented Sept. 20, 1971

3,605,963
MIST LUBRICATING AND COOLING APPARATUS FOR A TORQUE-TRANSMITTING MECHANISM
Ellwood L. Roob and Alfred Penko, Parma, and William W. Lyth, Cleveland, Ohio, assignors to Eaton Yale & Towne Inc., Cleveland, Ohio
Filed Feb. 3, 1970, Ser. No. 8,178
Int. Cl. F16d 67/04, 13/74
U.S. Cl. 192—18A
9 Claims

ABSTRACT OF THE DISCLOSURE

A torque-transmitting mechanism for transmitting torque between a pair of relatively rotatable members includes friction discs drivingly connected to one of the relatively rotatable members and other friction discs drivingly connected to the other relatively rotatable member. Means is provided to cool and lubricate the friction discs when torque is transmitted thereby. The torque-transmitting mechanism also includes means for moving the friction discs into frictional engagement to effect the transmission of torque between the relatively rotatable members. The means for cooling and lubricating the friction discs includes a mist generator for generating a mist and means defining a passageway for conducting the mist from the mist generator to the friction discs to effect lubrication and cooling thereof.

---

The present invention relates to a torque-transmitting mechanism for transmitting torque between a pair of relatively rotatable members and, more particularly, to a torque-transmitting mechanism having means for cooling and lubricating the friction discs.

Torque-transmitting mechanisms for transmitting torque between a pair of relatively rotatable members by means of a first plurality of friction discs drivingly connected with one of the rotatable members and a second plurality of friction discs drivingly connected with the other relatively rotatable member are known. Means have also been provided to lubricate and cool these friction discs. One example of a lubricating and cooling means comprises a splash system in which a bath of oil is splashed onto the friction discs to cool and lubricate them. Another example is one in which the friction discs are operated in an oil bath and are thereby cooled and lubricated. Combinations of a bath and splash system are also known.

These prior art mechanisms are sluggish and slow in response, since the friction discs are forced to act in a very dense atmosphere of cooling and lubricating fluid. In addition, when a lubricating bath is used in such a mechanism and the rotational axis of the mechanism is substantially vertically disposed, the upper friction discs of the torque-transmitting mechanism may not be effectively cooled and lubricated, since the bath may only contact the lower discs and since the fluid level may not cover the friction discs in their entirety.

It should be understood that when the torque-transmitting mechanism has one set of friction discs which acts as a clutch and another set which acts as a brake, and those friction discs are generally disposed along a vertical axis, one of the torque-transmitting devices will not be effectively cooled and lubricated by the oil bath unless the oil is in communication with the entire torque-transmitting mechanism. Even with this amount of cooling and lubricating medium in the torque-transmitting mechanism, the bearings thereof are not effectively cooled and lubricated, since the lubricating medium will not migrate to the uppermost bearings. By providing such a great quantity of cooling and lubricating fluid in the system, the movement of the clutch or brake friction discs are inhibited from actuation in a relatively small response time due to the fact that the discs must displace the heavy dense fluid before engaging.

The present invention overcomes these problems of the prior art by providing a torque-transmitting mechanism for transmitting torque between a pair of relatively rotatable members by means of a first plurality of friction discs drivingly connected with one of the rotatable members and a second plurality of friction discs drivingly connected with the other relatively rotatable member. A mist generator is provided for generating a lubricating and cooling air-oil mist. The air-oil mist is conducted by a passageway from the mist generator to the friction discs and to the bearings of the torque-transmitting mechanism to effect cooling and lubrication thereof. Since the air-oil mist is relatively light, the response time of the torque-transmitting mechanism is extremely fast.

When the torque-transmitting mechanism of the present invention has its rotational axis disposed in a substantially vertical direction, the effectiveness of the air-oil mist is not changed by gravity, as is the splash and oil bath system discussed above, and thereby the bearings and friction discs are effectively cooled and lubricated regardless of the disposition of the torque-transmitting mechanism. More specifically, when the torque-transmitting mechanism of the present invention includes friction discs which act as a clutch and other friction discs which act as a brake, both the clutch and the brake will be effectively lubricated regardless of the position of the torque-transmitting mechanism, since gravity does not affect the air-oil mist as much as the more dense liquid oil used in a bath or splash system.

Accordingly, it is an object of the present invention to provide a torque-transmitting mechanism for transmitting torque between a pair of relatively rotatable members by means of a first plurality of friction discs drivingly connected with one of the rotatable members and a second plurality of friction discs drivingly connected with the other relatively rotatable member and which discs are effectively cooled and lubricated in any position in which the torque-transmitting mechanism may be oriented.

Another object of the present invention is to provide a torque-transmitting mechanism for transmitting torque between a pair of relatively rotatable members by means of a first plurality of friction discs drivingly connected to one of the relatively rotatable members and a second plurality of friction discs drivingly connected to the other relatively rotatable member and which discs are effectively cooled and lubricated in a manner which allows for a relatively fast response time for engagement and disengagement of the torque-transmitting discs.

A further object of the present invention is to provide a torque-tramsmitting mechanism for transmitting torque between a pair of relatively rotatable members by means of a first plurality of friction discs drivingly connected with one of the rotatable members and a second plurality of friction discs drivingly connected with the other relatively rotatable member and which discs are effectively cooled and lubricated by means of an air-oil mist regardless of the position in which the torque-transmitting mechanism is oriented.

It is yet another object of the present invention to provide a torque-transmitting mechanism for transmitting torque between a pair of relatively rotatable members by means of a first plurality of friction discs drivingly connected with one of the rotatable members and a second plurality of friction discs drivingly connected with the second relatively rotatable member which includes bearings for supporting the relatively rotatable members and a mist generator for generating an air-oil mist which cools and lubricates the bearings and the first and second pluralities of friction discs.

Further objects, advantages, and features of the present invention will be apparent to those skilled in the art to which it relates from the following detailed description of a preferred embodiment of the present invention made with reference to the accompanying drawings in which:

FIG. 2 is a partial, fragmentary cross-sectional view of the torque-transmitting mechanism shown in FIG. 1 wherein the clutch is in an engaged position;

FIG. 3 is a partial, fragmentary cross-sectional view of the torque-transmitting mechanism shown in FIG. 1 wherein the brake is in an engaged position; and FIG. 4 is a fragmentary cross-sectional view of the mechanism shown in FIG. 1 and taken along lines 4—4 of FIG. 1.

Figure 1:
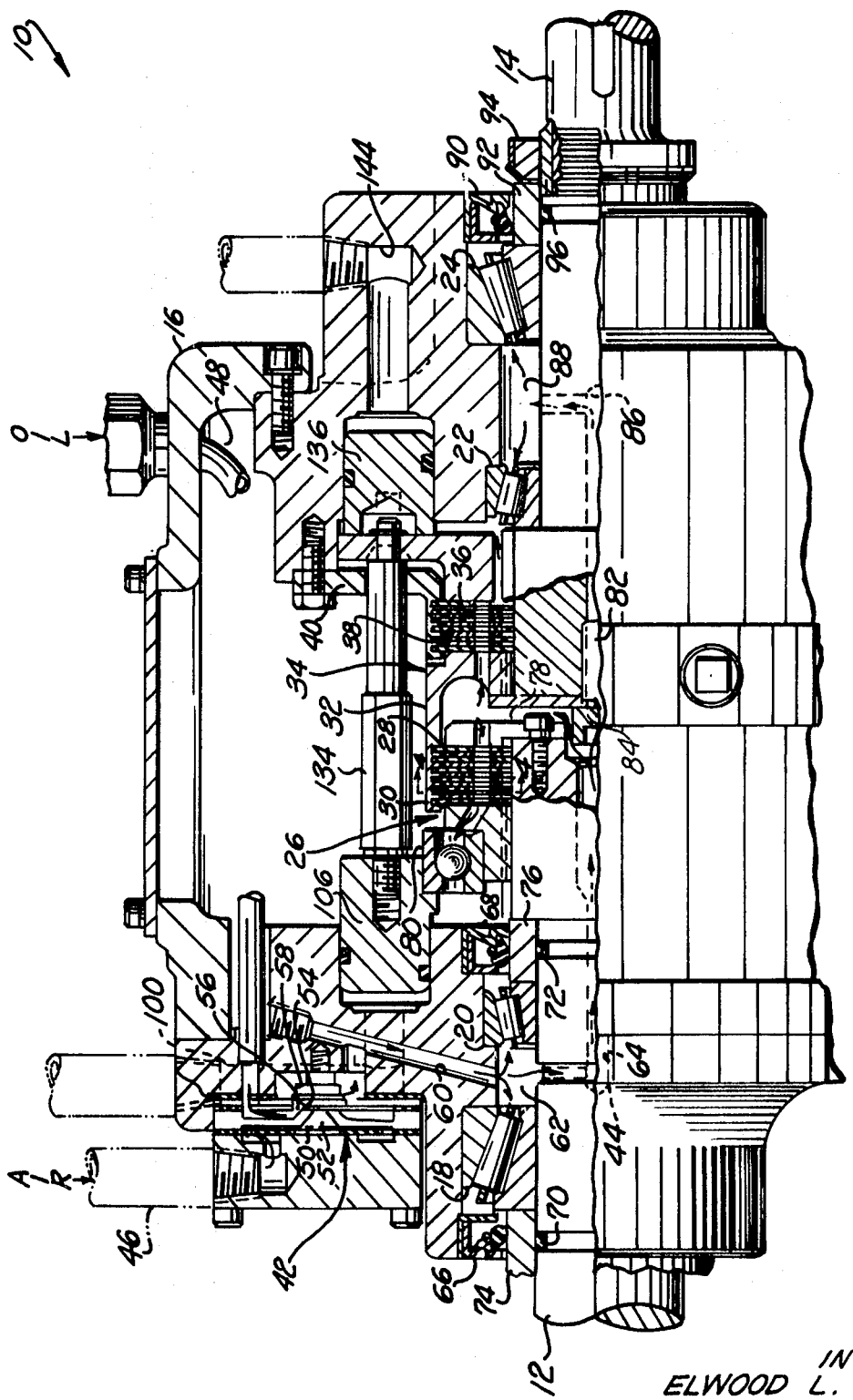
FIG. 1 is a sectional view of a torque-transmitting mechanism embodying the present invention and having a brake and a clutch.

The present invention provides a highly improved torque-transmitting mechanism for transmitting torque between a pair of relatively rotatable members by means of a first plurality of friction discs drivingly connected with one of the rotatable members and a second plurality of friction discs drivingly connected with the other relatively rotatable member. In particular, the present invention provides a highly improved means for lubricating and cooling the torque-transmitting mechanism and, more specifically, the friction discs. A torque-transmitting mechanism of the present invention is operable to direct a high-density air-oil mist to the friction discs and thereby provide for effective cooling and lubricating of the friction discs. Such a system allows the friction discs to be engaged and disengaged extremely rapidly. In addition, the torque-transmitting mechanism of the present invention provides for effective cooling and lubricating of the friction discs in any position in which the mechanism is disposed. A torque-transmitting mechanism 10 is shown in FIG. 1 and is representative of the present invention.

The torque-transmitting mechanism of the present invention includes an input and output member 12, 14, respectively. A housing member 16 is provided having bearings 18, 20 for rotatably supporting the input member 12 and bearings 22, 24 for rotatably supporting the output member 14.

A clutch 26 is provided having a first plurality of friction discs 28 drivingly connected to the input member 12 and a second plurality of friction discs 30 drivingly connected to a drive member 32 which is, in turn, drivingly connected to the output member 14. The clutch 26 acts to engage and disengage the driving relationship of the input member 12 with respect to the output member 14.

A brake 34 is provided having a plurality of friction discs 36 drivingly connected to the output member 14, and a plurality of friction discs 38 drivingly connected to the housing 16 by means of the stationary member 40. When the brake 34 is actuated, the friction discs 36, 38 frictionally engage each other to transmit torque from the housing which is non-rotatably secured to a base and the output shaft 14, and thereby retard rotational movement of the output member 14.

A mist generator means 42 is provided for generating a lubricating and cooling air-oil mist. The air-oil mist is conducted from the mist generator 42 to the bearings 18, 20, 22, 24, clutch 26 and brake 34 by means of a conduit, generally indicated at 44.

The mist generator 42 may be constructed in any manner well known to those skilled in the art and, as shown in FIG. 1, is constructed in accordance with the design shown in United States patent application Ser. No. 825,726, assigned to the assignee of the present invention. The mist generator 42 generates an oil mist in an air carrier by receiving air through conduit 46 and oil through conduit 48 to supply the oil chamber 56 with oil. The air moves through the conduit 46 and into an air chamber 50 having a vortex chamber 52. The vortex chamber 52 is designed such that when the air leaves the outlet of the vortex chamber 52, it is rotating at a high velocity and moving in a direction generally axially of its direction of rotation.

As the air moves out of the vortex chamber 52, it flows into a chamber 54 which may be referred to as a "mixing" chamber. The mixing chamber 54 allows the rotating mass of fluid to draw oil from the oil chamber 56 as it passes the oil chamber 56. The oil which is drawn into the mass of fluid is sheared due to high rotational velocity of the fluid and is formed of the small particles in the mixing chamber 54 and is entrained by the flow of the fluid.

A particle-size regulator disc or member 58 is located in the path of movement of the rotating flow of fluid as it exits the mixing chamber 54. The member 40 is adjustably secured to the housing 16 such as by a threaded portion, as shown in FIG. 1. The member 58 comprises a mist-density adjustment means which is operable upon movement relative to the vortex outlet to vary the mist density as the member 58 is moved with respect to the chambers 52, 54. As the member 58 is moved with respect to the chambers 52, 54, the size of the oil particles in the mist will vary. For example, as the member 58 is moved toward the chamber 54, a high percentage of oil particles in the mist will decrease in size. Additionally, a movement of the member 58 varies the suction created by the rotating mass of fluid as it flows through the mixing chamber 54. By moving the member 58 toward the mixing chamber 54, the vacuum in the mixing chamber 54 is increased. Conversely, when the member 58 is moved away from the mixing chamber 54, the vacuum in the mixing chamber 54 is decreased, resulting in a reduced flow rate and less efficient particleization of the oil contained in the fluid.

The oil mist is conducted from the mist generator 42 by the conduit 44, which consists of a passageway 60 leading from the mist generator 42 and a chamber 62 in fluid communication with the passageway 60. The chamber 62 receives the air-oil mist from the conduit 60 and is in fluid communication with the bearings 18, 20. The air-oil mist migrates into the bearings 18, 20 from the chamber 62 to cool and lubricate the bearings 18, 20. The remainder of the air-oil mist moves through the conduit 64 in the input member 12. It should be understood that the passageway 64 is in constant communication with the chamber 62 through its radial portion. For example, when the input shaft 12 is rotating, the radial portion of the passageway 64 will be in fluid communication with the chamber 62 regardless of the rotational position of the shaft 12 with respect to the housing 16.

The air-oil mist lubricates the bearings 18, 20 and may flow along the rotational axis of these bearings to the outer portion of the bearings 18, 20. Further flow of the air-oil mist is prohibited by sealing means 66, 68 and axial flow of the air-oil mist along the outer surface of the input shaft 12 is prohibited by the O-rings 70, 72 positioned about the peripheral surface of the input shaft 12. The sealing means 66, 68 are secured to the housing 16 and seal against a member 74. The members 74 and 76 are press-fitted onto the input shaft 12 and rotated therewith. The seals 70, 72 seal the space between the members 74, 76 and the input shaft 12 to prohibit mist from escaping along the peripheral portion of the input shaft 12.

The air-oil mist moves into a radial portion of the shaft 64 which is in constant communication with the chamber 62, regardless of what angular position the input shaft 12 may be in with respect to the fixed housing member 16, as hereinabove described. The air-oil mist moves axially along the passageway 64 which is generally centrally located in the input shaft 12. When the air-oil mist reaches the end of the input shaft 12, a portion of the mist moves into chamber 78 and moves axially therefrom to lubricate and cool clutch 26, brake 34 and the bearings 80, 82.

Another portion of the air-oil mist leaving the passageway 64 of the input shaft 12 is received by an opening 82 in the threaded fastener 84. The opening 82 is in communication with a passageway 86 in the output shaft 14 which is in fluid communication with a chamber 88 defined by the housing 16, bearings 22, 24, and output shaft 14. The oil mist moves axially through the passageway 86 and then radially until it reaches the chamber 88. Thereupon, the air-oil mist moves axially to cool and lubricate the bearings 22, 24.

Sealing means 90 are provided to prohibit axial flow of the air-oil mist from the bearing 24 to the atmosphere. The sealing means 90 is secured to the housing 16 and rotates relative to the member 92 which is secured to the output shaft 14.

An O-ring 96 is provided in a groove in the output shaft 14 to prohibit axial flow of the air-oil mist along the outer peripheral surface of the output shaft 14 to the atmosphere. The O-ring 96 seals against the member 92 to prohibit axial flow of the air-oil mist along the flow of the outer peripheral surface of the output shaft 14 to the atmosphere. Means 94 are provided to prohibit axial movement of the member 92 with respect to the output shaft 14.

To more fully appreciate the cooling and lubricating characteristics of the air-oil mist on the clutch 26 and brake 38, FIGS. 2 and 3 show the effective positions of the parts of the torque-transmitting mechanism when in their respective operative conditions. When the friction discs 28, 30 are in frictional engagement with each other, torque is transmitted from the input shaft 12 to the output shaft 14.

To actuate the clutch 26, pressurized air is introduced into the conduit 100. The pressurized air flows from the conduit 100 into the chamber 102 of the actuator 104. The actuator 104 has a piston 106 with sealing means 108. The piston 106 of the actuator 104 is contained in a cylindrical wall 110 defined by the housing 16. When pressurized air is introduced into the chamber 102, the piston moves in a direction generally indicated by the arrow 112 and moves to a clutch-actuating position, as shown in FIG. 2.

The piston 106 has a step portion 114 for engaging the outer race of the bearing means 108. When the piston 106 is moved to a clutch-actuating position, as shown in FIG. 2, the bearing transmits an actuating force to the splined member 116. The splined member 116 slidably engages the input shaft 12, but is non-rotatable with respect thereto as a result of complementary splines on the input shaft 12, as shown in FIG. 4. The splined member 116 has a passageway 118 therein to allow oil mist to cool and lubricate the bearings 108.

When the splined member 116 is moved to a clutch-engaging position, as shown in FIG. 2, the friction discs 28 which are slidably engaged by the input shaft 12, as shown in FIG. 4, move into frictional contact with the output friction discs 30 of the clutch 26. A member 120 is secured to the input shaft 12 to prohibit further axial movement of the friction discs 28, 30 with respect to each other and provide for frictional engagement of the friction discs 28, 30.

The torque exerted on the input shaft is transmitted to the input friction discs 28 by means of an external spline 122 on the input member 12, as shown in FIG. 4. The friction discs 28 have complementary internal splines, generally designated at 124, which engage the external splines 122 of the input member 12 to allow the friction discs 28 to be slidable but non-rotatable with respect to the input shaft 12.

The friction discs 30 are provided with extending portions 126 which are slidably received by complementary grooves 130 in the drive member 32. The friction discs 30 transmit torque through their extending portions 126 to the drive member 32 by engaging the grooves 130 of the drive member 32.

When the clutch 26 is in a disengaged position, the friction discs 28, 30 are free to move in an axial direction with no friction therebetween such that torque is not transmitted from the input friction discs 28 to the output friction discs 30. When the clutch 26 is actuated, the discs 30 are in frictional engagement and torque is transmitted therebetween, thereby drivingly connecting the input shaft 12 to the driving member 32. The drive member 32 is drivingly connected to the output shaft 30 by means of complementary splines on each of the afore-mentioned members.

The clutch 26 is properly cooled and lubricated by providing an opening 128 in the member 120 which is secured to the input shaft 12. The air-oil mist flows through the opening 128 and through openings 130 in the input friction discs 28 and is allowed to move in a radial direction to cool and lubricate the frictional faces of the friction discs 28, 30. The air-oil mist continues to move in a generally axial direction and moves through the opening 118 in the member 116 to lubricate the bearing 80.

A member 134 attaches the piston 106 of the clutch actuator 104 to the piston 136 of the brake actuator 138. The brake actuator 138 has a cylinder 140 for retaining the piston 136. The chamber 142 defined by the cylinder 140 and piston 136 may be connected and disconnected to a supply of pressurized air. Sealing means 146 are provided in annular grooves in the piston 136 of the actuator 138 to seal leakage of any pressurized fluid contained in the chamber 142 of the actuator 138 when pressurized fluid is introduced thereto. When pressure is introduced into the chamber 102 of the clutch actuator 104, pressurized air is not introduced into the chamber 142 of the hydraulic actuator 138. Thus, the member 134 moves the piston 136 in a direction indicated by the arrow 112.

The actuation of the clutch actuator 104 forces the friction discs 28, 30 into engagement to transmit torque from the input shaft 12 to the output shaft 14. It should be noted that when the piston 136 is so moved by actuation of the clutch actuator 104 by the member 134, the stop member 148 which is attached to the piston 136 is retracted a certain distance to a position as shown in FIG. 2 and assures that the brake 34 is in a release condition.

The friction discs 36 are drivingly connected to the output shaft 14 in a similar manner, as described in connection with the friction discs 28 with respect to the input shaft 12. Thus, the friction discs 36 can slide axially relative to the output shaft 14, but cannot rotate with respect thereto. The friction discs 38 are drivingly connected to the member 40 in a similar manner as described in connection with the friction discs 30 with respect to the drive member 32. The member 40 is a part of the housing and, as such, is secured to the base through other members of the housing 16.

When the stop member 148 is moved in a direction 112 by actuation of the clutch actuator 104 and consequent movement of the actuator 138, the brake 34 is disengaged and the friction discs 36, 38 are not in frictional engagement with each other. When the torque-transmitting mechanism 10 is in such an operational mode, torque is transmitted from the input shaft 12 to the output shaft 14 without braking of the output shaft 14.

When the clutch 26 is actuated, the friction discs 28, 30 are continually lubricated by flow of the oil mist through the passageway 128 in the member 120 and openings 130 in the friction discs 28. The air-oil mist also flows through the brake 34 in passageways 150 and 152 to cool and lubricate the friction discs 36, 38. The air-oil mist continues to flow past the brake 34 to cool and lubricate the bearing 22.

When pressurized air is introduced into the conduit 144 and the passageway 100 is exhausted to the atmosphere, the brake 34 is actuated and the clutch 26 is disengaged. Thus, the input shaft 12 is disengaged from the output shaft 14 and rotational movement of the output shaft 14 is retarded by the brake 34.

When a pressurized air is introduced into the passageway 144, the chamber 142 of the brake actuator 138 is pressurized to move the piston 136 to the position shown in FIG. 3. When the piston 136 is in such a position, the stop member 148, which is secured to the piston 136, moves the friction discs 36, 38 of the brake 34 together into frictional engagement with each other. The friction discs 36, 38 are compressed by the stop member 148 by the piston 136, since they are positioned between the drive member 32 which is fixed to the output shaft 14 and the stop member 148 secured to the piston 136. Since the friction discs 38 are drivingly connected with the housing 16 and the friction discs 36 are drivingly connected to the output shaft 14, rotation of the output shaft 14 is impaired when the actuator 138 is actuated.

The member 134 interconnecting the actuators 104 and 138 move the clutch 26 to a disengaged position, as shown in FIG. 3, where the friction discs 30, 28 are disengaged with respect to each other and torque is not transmitted from the input shaft 12 to the drive member 32.

When the torque-transmitting mechanism 10 is in such a position, the oil mist continues to supply the clutch 26 and brake 34 with an air-oil mist to cool and lubricate the respective members and bearings. Thus, it may be seen that regardless of what position the torque-transmitting mechanism is in, the bearings and friction discs of the torque-transmitting mechanism 10 are always properly lubricated and cooled by the air-oil mist. It should be apparent that the torque-transmitting mechanism shown in FIGS. 1-4 is representative of the invention showing the concept of lubricating a plurality of friction discs and bearings with an air-oil mist.

The air-oil mist condenses during the movement thereof. The oil is then recirculated through conduit 48 into the mist generator 42. A plug 165 is mounted in the housing and is in the form of a conventional breather plug which allows for exhaust of air therefrom. The plug 165 also provides for filling the housing with oil.

It should be apparent that applicant has provided a torque-transmitting mechanism 10 for transmitting torque between a pair of relatively rotatable members 12 and 14 or 16 and 14 by means of a plurality of friction discs 28, 30 or 36, 38 attached to each of the relatively rotatable members respectively. The torque-transmitting mechanism 10 includes means to cool and lubricate the friction discs when torque is transmitted thereby. The means for cooling and lubricating the friction discs includes a mist generator 42 for generating an air-oil mist and means defining a passageway for conducting the air-oil mist from the mist generator to the friction discs to effect lubrication and cooling thereof. The torque-transmitting mechanism also includes means for moving the friction discs into frictional engagement to effect the transmission of torque between the relatively rotatable members.

Having described our invention, we claim:

1. A torque-transmitting mechanism comprising a pair of relatively rotatable members, a first plurality of friction discs drivingly connected with one member and a second plurality of friction discs drivingly connected with the other member, means for moving said first and second pluralities of friction discs into frictional engagement to effect transmission of torque between said pair of rotatable members, a housing defining a chamber in which said first and second plurality of friction discs are located, said pair of relatively rotatable members comprising a shaft member extending into said chamber and a rotatable member located in said chamber, said rotatable member being drivingly connected with a second rotatable shaft extending from said chamber outwardly to the exterior of said housing, first bearing means supporting said first rotatable shaft for rotation relative to said housing and second bearing means supporting said second rotatable shaft for rotation relative to said housing, a third plurality of friction discs drivingly connected with said second rotatable shaft and a fourth plurality of friction discs drivingly connected with said housing, said first and second plurality of friction discs providing a clutch for effecting a drive between said first and second rotatable shafts and said third and fourth friction discs providing a brake for braking the rotation of said second rotatable shaft, a mist generator means for generating a lubricating and cooling air-oil mist, and means defining a passageway for conducting the air-oil mist from said mist generator to said first, second, third and fourth pluralities of friction discs to effect lubrication and cooling thereof.

2. A torque-transmitting mechanism as defined in claim 1 wherein said means defining a passageway comprises a portion of said housing defining a first passageway and a portion of said first shaft member communicating with said first passageway and defining a second passageway for directing air-oil mist to a location between said first and second plurality of friction discs on the one hand and said third and fourth plurality of friction discs on the other hand, said second rotatable shaft defining a passageway for directing air-oil mist from said passageway in said first shaft to said second bearing means.

3. A torque-transmitting mechanism as defined in claim 2 wherein said means for moving said first and second plurality of friction discs into engagement includes means for moving said third and fourth plurality of friction discs out of engagement when said first and second plurality of friction discs move into engagement.

4. A torque-transmitting mechanism comprising a housing defining a chamber thereon, a pair of relatively rotatable shafts extending into said chamber, bearing means interposed between said housing and one of said shafts and supporting said one shaft for rotation relative to said housing, a portion of said housing and a portion of said shaft defining a chamber therebetween adjacent said bearing means, a mist generator means for generating a lubricating and cooling air-oil mist secured to said housing, and means defining a passageway in said housing for conducting the air-oil mist from the mist generator to said chamber to effect lubrication of said bearing means, a clutch mechanism actuatable to drivingly connect said relatively rotatable shafts, said clutch means comprising a first plurality of friction discs drivingly connected with one of said rotatable shafts and a second plurality of friction discs drivingly connected with a member which in turn is drivingly connected with said other rotatable shaft, one of said rotatable shafts includes a passageway for directing air-oil mist from said chamber to said clutch means, a brake mechanism cooperable with said other rotatable shaft and said housing to effect braking of said other rotatable shaft upon actuation thereof, said brake mechanism comprising a third plurality of friction discs drivingly connected with said other rotatable shaft and a fourth plurality of friction discs drivingly connected with said housing.

5. A torque-transmitting mechanism as defined in claim 4 wherein an air-oil mist chamber is located between said clutch mechanism and said brake mechanism and air-oil mist is directed thereto from said mist generator and flows into said clutch mechanism and brake mechanism therefrom.

6. A torque-transmitting mechanism as defined in claim 5 wherein said friction discs of said first, second, third and fourth plurality of friction discs have openings therein for directing air-oil mist therethrough.

7. A torque-transmitting mechanism comprising a housing defining a chamber therein, first and second shafts extending into said chamber, first bearing means interposed between said first shaft and said housing and rotatable supporting said first shaft, second bearing means interposed between said second shaft and said housing and rotatable supporting said second shaft, a clutch mechanism operable to transmit torque between said first and second shafts, said clutch mechanism comprising a plurality of friction discs drivingly connected with the first shaft and a plurality of friction discs drivingly connected with the second shaft, means for actuating said clutch mechanism between an engaged condition and a disengaged condition, a brake mechanism operatively associated with the second shaft, said brake mechanism comprising a plurality of friction discs drivingly connected with the second shaft and a plurality of friction discs connected with the housing, means for effecting actuation of said brake to brake said second shaft upon operation of said clutch means to said disengaged condition, a mist generator secured to said housing and operable to generate an air-oil mist, a fluid passageway in said housing providing a passageway for directing mist toward one of said shafts, said one of said shafts having at least one opening communicating with said passageway in said housing, said one of said shafts having an axially extending passageway communicating with said opening to provide for flow of mist axially therealong, said axially extending passageway in said one of said shafts communicating with a chamber interposed between said clutch discs and said brake discs to provide for cooling and lubrication of said clutch and brake.

8. A torque-transmitting mechanism as defined in claim 7 wherein said other of said shafts has an axially extending passageway therein for directing the air-oil mist to said second bearing means.

9. A torque-transmitting mechanism as defined in claim 8 further including first seal means associated with said housing and said first shaft for preventing the air-oil mist from escaping from said housing therepast, and second seal means cooperating with said second shaft and said housing and providing a seal for preventing the air-oil mist from escaping therepast.

References Cited
UNITED STATES PATENTS

| | | | |
|---|---|---|---|
| 2,539,065 | 1/1951 | Erwood et al. | 192—113BX |
| 2,803,764 | 8/1957 | Lundskow | 192—113BX |
| 3,202,253 | 8/1965 | Merritt et al. | 192—113B |
| 3,494,450 | 2/1970 | Mankowsky et al. | 192—18A |

MANUEL A. ANTONAKAS, Primary Examiner

U.S. Cl. X.R.

184—6.26; 192—113B